United States Patent
Rule et al.

(10) Patent No.: US 12,520,136 B2
(45) Date of Patent: Jan. 6, 2026

(54) SYSTEMS AND METHODS FOR CONTEXT-SWITCHING AUTHENTICATION OVER SHORT RANGE WIRELESS COMMUNICATION

(71) Applicant: Capital One Services, LLC, McLean, VA (US)

(72) Inventors: Jeffrey Rule, Chevy Chase, MD (US); Stephane Lunati, Boerne, TX (US); Kaitlin Newman, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 328 days.

(21) Appl. No.: 17/731,080

(22) Filed: Apr. 27, 2022

(65) Prior Publication Data

US 2023/0354020 A1   Nov. 2, 2023

(51) Int. Cl.
| H04W 12/06 | (2021.01) |
| H04L 9/32 | (2006.01) |
| H04W 4/80 | (2018.01) |
| H04W 12/47 | (2021.01) |

(52) U.S. Cl.
CPC .......... *H04W 12/06* (2013.01); *H04L 9/3213* (2013.01); *H04W 4/80* (2018.02); *H04W 12/47* (2021.01)

(58) Field of Classification Search
CPC ....... H04W 12/06; H04W 4/80; H04W 12/47; H04L 9/3213
See application file for complete search history.

(56) References Cited

U.S. PATENT DOCUMENTS

| 5,590,038 A | 12/1996 | Pitroda |
| 5,666,415 A | 9/1997 | Kaufman |
| 6,199,114 B1 | 3/2001 | White |

(Continued)

FOREIGN PATENT DOCUMENTS

| CN | 101192295 A | 6/2008 |
| GB | 2516861 A | 2/2015 |

(Continued)

OTHER PUBLICATIONS

Notification of Transmittal of the International Search Report and the Written Opinion of the International Searching Authority issued in PCT/US2023/019958, mailed Aug. 1, 2023, 22 pages.

(Continued)

*Primary Examiner* — Jung W Kim
*Assistant Examiner* — Alan L Kong
(74) *Attorney, Agent, or Firm* — KDW Firm PLLC; Andrew D. Kasnevich

(57) ABSTRACT

Systems and methods is provided for implementing a strong user authentication across a public network. One operational aspect of the disclosed systems and methods involves the integration of a browser functionality to communicate with processes and hardware elements on a device initiating the network connection to implement a context-switching authentication scheme. Disclosed system and process further involves an implementation of a two-factor strong authentication based on a single authentication input from a user involving an NFC read of a contactless card by a mobile device within Bluetooth proximity of the device initiating the network connection.

20 Claims, 7 Drawing Sheets

(56) References Cited

U.S. PATENT DOCUMENTS

| | | |
|---|---|---|
| 6,324,271 B1 | 11/2001 | Sawyer |
| 6,367,011 B1 | 4/2002 | Lee |
| 6,572,015 B1 | 6/2003 | Norton |
| 7,252,242 B2 | 8/2007 | Ho |
| 7,270,276 B2 | 9/2007 | Vayssiere |
| 7,287,692 B1 | 10/2007 | Patel |
| 7,374,099 B2 | 5/2008 | de Jong |
| 7,527,208 B2 | 5/2009 | Hammad |
| 7,568,631 B2 | 8/2009 | Gibbs |
| 7,584,153 B2 | 9/2009 | Brown |
| 7,628,322 B2 | 12/2009 | Holtmanns |
| 7,793,851 B2 | 9/2010 | Mullen |
| 7,801,799 B1 | 9/2010 | Brake, Jr. |
| 7,908,216 B1 | 3/2011 | Davis |
| 7,922,082 B2 | 4/2011 | Muscato |
| 8,010,405 B1 | 8/2011 | Bortolin |
| 8,074,877 B2 | 12/2011 | Mullen |
| 8,082,450 B2 | 12/2011 | Frey |
| 8,108,687 B2 | 1/2012 | Ellis |
| 8,186,602 B2 | 5/2012 | Itay |
| 8,196,131 B1 | 6/2012 | von Behren |
| 8,249,654 B1 | 8/2012 | Zhu |
| 8,276,814 B1 | 10/2012 | Davis |
| 8,332,272 B2 | 12/2012 | Fisher |
| 8,346,670 B2 | 1/2013 | Hasson |
| 8,406,733 B2 | 3/2013 | Raleigh |
| 8,511,547 B2 | 8/2013 | Rans |
| 8,519,822 B2 | 8/2013 | Riegebauer |
| 8,646,020 B2 | 2/2014 | Reisman |
| 8,750,514 B2 | 6/2014 | Gallo |
| 8,870,081 B2 | 10/2014 | Olson |
| 9,038,893 B2 | 5/2015 | Kirkham |
| 9,129,199 B2 | 9/2015 | Spodak |
| 9,183,490 B2 | 11/2015 | Moreton |
| 9,275,325 B2 | 3/2016 | Newcombe |
| 9,286,606 B2 | 3/2016 | Diamond |
| 9,306,753 B1 | 4/2016 | Vandervort |
| 9,501,776 B2 | 11/2016 | Martin |
| 9,710,744 B2 | 7/2017 | Wurmfeld |
| 9,949,065 B1 | 4/2018 | Zarakas |
| 9,965,632 B2 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,122,719 B1 * | 11/2018 | Vltavsky ............... H04W 12/33 |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,686,655 B2 | 6/2020 | Rjeili et al. |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,206,258 B2 * | 12/2021 | Ericson ............... H04L 63/0853 |
| 11,216,806 B2 | 1/2022 | Mossler |
| 11,222,330 B2 | 1/2022 | Dua |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 * | 1/2023 | Cook ............... G06Q 20/341 |
| 11,556,918 B2 | 1/2023 | Mestre |
| 11,615,395 B2 | 3/2023 | McHugh |
| 11,777,933 B2 | 10/2023 | Moreton |
| 2003/0220876 A1 | 11/2003 | Burger |
| 2005/0156026 A1 | 7/2005 | Ghosh |
| 2005/0228997 A1 | 10/2005 | Bicker |
| 2005/0269402 A1 | 12/2005 | Spitzer |
| 2007/0276765 A1 | 11/2007 | Hazel |
| 2008/0082452 A1 | 4/2008 | Wankmueller |
| 2008/0099552 A1 | 5/2008 | Grillion |
| 2009/0143104 A1 | 6/2009 | Loh |
| 2009/0235339 A1 | 9/2009 | Mennes |
| 2009/0282264 A1 | 11/2009 | Amiel |
| 2011/0113245 A1 | 5/2011 | Varadarajan |
| 2011/0155801 A1 | 6/2011 | Rowberry |
| 2012/0143703 A1 | 6/2012 | Wall |
| 2013/0013499 A1 * | 1/2013 | Kalgi ............... G06Q 20/386 |
| | | 705/41 |
| 2013/0030997 A1 | 1/2013 | Spodak |
| 2013/0146657 A1 | 6/2013 | Graef |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0365377 A1 | 12/2014 | Salama |
| 2015/0032635 A1 | 1/2015 | Guise |
| 2015/0073983 A1 | 3/2015 | Bartenstein |
| 2015/0113271 A1 | 4/2015 | Jooste |
| 2015/0134513 A1 | 5/2015 | Olson |
| 2015/0199673 A1 | 7/2015 | Savolainen |
| 2015/0199863 A1 | 7/2015 | Scoggins |
| 2015/0254637 A1 | 9/2015 | Yang |
| 2015/0317295 A1 | 11/2015 | Sherry |
| 2016/0073262 A1 * | 3/2016 | Schmidt ............... H04L 63/0853 |
| | | 726/7 |
| 2016/0078430 A1 | 3/2016 | Douglas |
| 2016/0189143 A1 | 6/2016 | Koeppel |
| 2016/0253651 A1 | 9/2016 | Park |
| 2016/0277383 A1 | 9/2016 | Guyomarc'H |
| 2016/0307189 A1 | 10/2016 | Zarakas |
| 2016/0314472 A1 | 10/2016 | Ashfield |
| 2016/0379217 A1 | 12/2016 | Hammad |
| 2017/0017957 A1 | 1/2017 | Radu |
| 2017/0039566 A1 | 2/2017 | Schipperheijn |
| 2017/0041973 A1 * | 2/2017 | Liao ............... H04W 4/02 |
| 2017/0068950 A1 | 3/2017 | Kwon |
| 2017/0330173 A1 | 11/2017 | Woo |
| 2018/0039987 A1 | 2/2018 | Molino |
| 2018/0123804 A1 | 5/2018 | Smith et al. |
| 2018/0268132 A1 | 9/2018 | Buer |
| 2018/0300716 A1 | 10/2018 | Carlson |
| 2019/0172055 A1 | 6/2019 | Hale |
| 2019/0288542 A1 | 9/2019 | Konanur et al. |

(56) References Cited

U.S. PATENT DOCUMENTS

| | | | |
|---|---|---|---|
| 2019/0303945 A1 | 10/2019 | Mitra | |
| 2020/0117321 A1* | 4/2020 | Phillips | G06K 19/06037 |
| 2021/0004806 A1 | 1/2021 | Noe | |
| 2021/0149622 A1 | 5/2021 | Falcon | |
| 2021/0272098 A1 | 9/2021 | Delsuc | |
| 2021/0304189 A1 | 9/2021 | Gupta | |
| 2021/0350443 A1* | 11/2021 | Isaacson | G06Q 20/203 |
| 2021/0383360 A1 | 12/2021 | Sinha | |
| 2021/0406869 A1 | 12/2021 | Pathrabe | |
| 2022/0050976 A1 | 2/2022 | Bergeron et al. | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | |
|---|---|---|
| GB | 2551907 A | 1/2018 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2021051884 A1 | 3/2021 |
| WO | 2021133492 A1 | 7/2021 |
| WO | 2022108959 A1 | 9/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw113/mac, 3 pages.

Author Unknown, "Autofill", Computer Hope [online] 2018 [retrieved on Mar. 25, 2019]. Retrieved from Internet URL: https://www/computerhope.com/jaro/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on May 25, 2019]. Retrieved from Internet URL: https://www.emvco.com/wp-content/uploads/2017/08/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.

Emvco: "EMV Card Personalisation Specification", Aug. 1, 2021, pp. 1-114, Retrievedfrom the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J.and Lindell, Y., "Aggregate Message Authentication Codes", Topics in Cryptology [online] 2008 [retrieved on Mar. 25, 2019]. Retrieved from Internet URL: https://www.cs.umd/edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] Apr. 10, 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al.,"On-card" User Authentication for Contactless Smart Cards based on Gesture Recogition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

SYSTEMS AND METHODS FOR CONTEXT-SWITCHING AUTHENTICATION OVER SHORT RANGE WIRELESS COMMUNICATION

FIELD OF THE DISCLOSURE

The present disclosure relates to systems and methods for providing authentication credentials and authenticated user information over a network, and more specifically to systems and methods for providing context-switching based authentication using short range wireless communication.

BACKGROUND

The authentication of a source of an access request, transmitted over public networks, to systems and applications storing access-restricted resources, such as sensitive user information, is a major challenge for enabling secure electronic transactions and/or user data access. Several routines for providing reliable user authentication prior to granting access to sensitive and/or private information have been devised. One such routine corresponds to a two-factor authentication process whereby the first form of authentication comprises a first verification of user identity based on specific access credential information (e.g., username and password) inputted by the user and a second form of authentication which is triggered after the first verification and generally constitute transmitting a message (e.g., push notification or an automated phone call sent to a user-registered device) to a pre-identified second device associated with the user, and receiving a user confirmation via the pre-identified second device. Such authentication schemes usually involve a third party data provider for pre-identifying the second device needed for carrying out the second authentication step. As such, existing systems and processes for implementing online access authentication are cumbersome requiring additional user authentication inputs, which further makes such processes prone to human error. These and other deficiencies exists.

SUMMARY OF THE DISCLOSURE

Embodiments of the present disclosure are directed to a method for authenticating a connection request from a first device associated with a user, using an authentication application stored on a second device associated with the same user, wherein the second device is communicatively coupled to the first device via a short range communication protocol such as Bluetooth Low Energy (BLE) link. The method may comprise: launching an authentication application, stored on a first user device, in response to a transmission received across a BLE link established between the first and a second user device, the transmission comprising a Uniform Resource Indicator (URI) which identifies the authentication application. The method may further comprise: generating, by the authentication application, a listing of authentication schemes available on the first user device, wherein each authentication scheme is associated with one or more authentication actions using the first user device; generating, by the authentication application, one or more authentication tokens to represent a successful authentication outcome of a user-selected authentication scheme and, transmitting the one or more authentication tokens across the BLE link, from the first user device to the second user device to thereby authenticate a web access request initiated, from a browser running on the second user device.

In some embodiments, one of the authentication schemes from the listing of authentication schemes available on the first user device may correspond to performing an NFC read of a contactless card by the first user device, the contactless card storing user identifying information as NFC transmittable data. The contactless card-based authentication scheme corresponds to a single user action of bringing the contactless card within NFC range of the first user device.

One aspect of the present disclosure is directed to a system for implementing context-switching authentication, the system may comprise: a computer hardware arrangement configure to: launch an authentication application, stored on a first user device, in response to a transmission received across a Bluetooth Low Energy (BLE) link established between the first and a second user device, the transmission comprising a Uniform Resource Indicator (URI) which identifies the authentication application. The computer hardware arrangement may be further configured to: generate, a listing of authentication schemes available on the first user device, wherein each authentication scheme is associated with one or more authentication actions performed by the first user device; generate one or more authentication tokens to represent a successful authentication outcome of a user-selected authentication scheme and, transmit the one or more authentication tokens across the BLE link to the second user device to thereby authenticate a web access request initiated from a browser running on the second user device.

In accordance to some embodiment the computer hardware arrangement may be configured to provide an authentication scheme comprising using the first user device as a reader for performing a Near Field Communication (NFC) read of a contactless card storing user identifying information as NFC transmittable data, and generating one or more authentication tokens to thereby authenticate a source of the web access request initiated from a browser running on the second user device.

Another aspect of the present disclosure is directed to a non-transitory computer-readable medium comprising instructions for execution by a computer hardware arrangement, wherein, upon execution of the instructions the computer hardware arrangement is configured to perform procedures comprising: launching an authentication application, stored on a first user device, in response to a transmission received across a Bluetooth link established between the first and a second user device, the transmission comprising a Uniform Resource Indicator (URI) which identifies the authentication application; generating a listing of authentication schemes available on the first user device, the listing being responsive to a selection input made using the first user device, wherein each authentication scheme is associated with one or more authentication actions performed by the user using the first user device; generating, one or more authentication tokens to represent a successful authentication outcome of a user-selected authentication scheme, and transmitting the one or more authentication tokens across the Bluetooth link to the second user device to thereby authenticate a web access request initiated from a browser running on the second user device.

In some embodiments an authentication scheme used for generating the one or more authentication tokens corresponds to a successful verification of one or more user identifying information retrieved by performing an NFC read of a contactless card by the first user device, the contactless card storing the user identifying information as NFC transmittable data.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
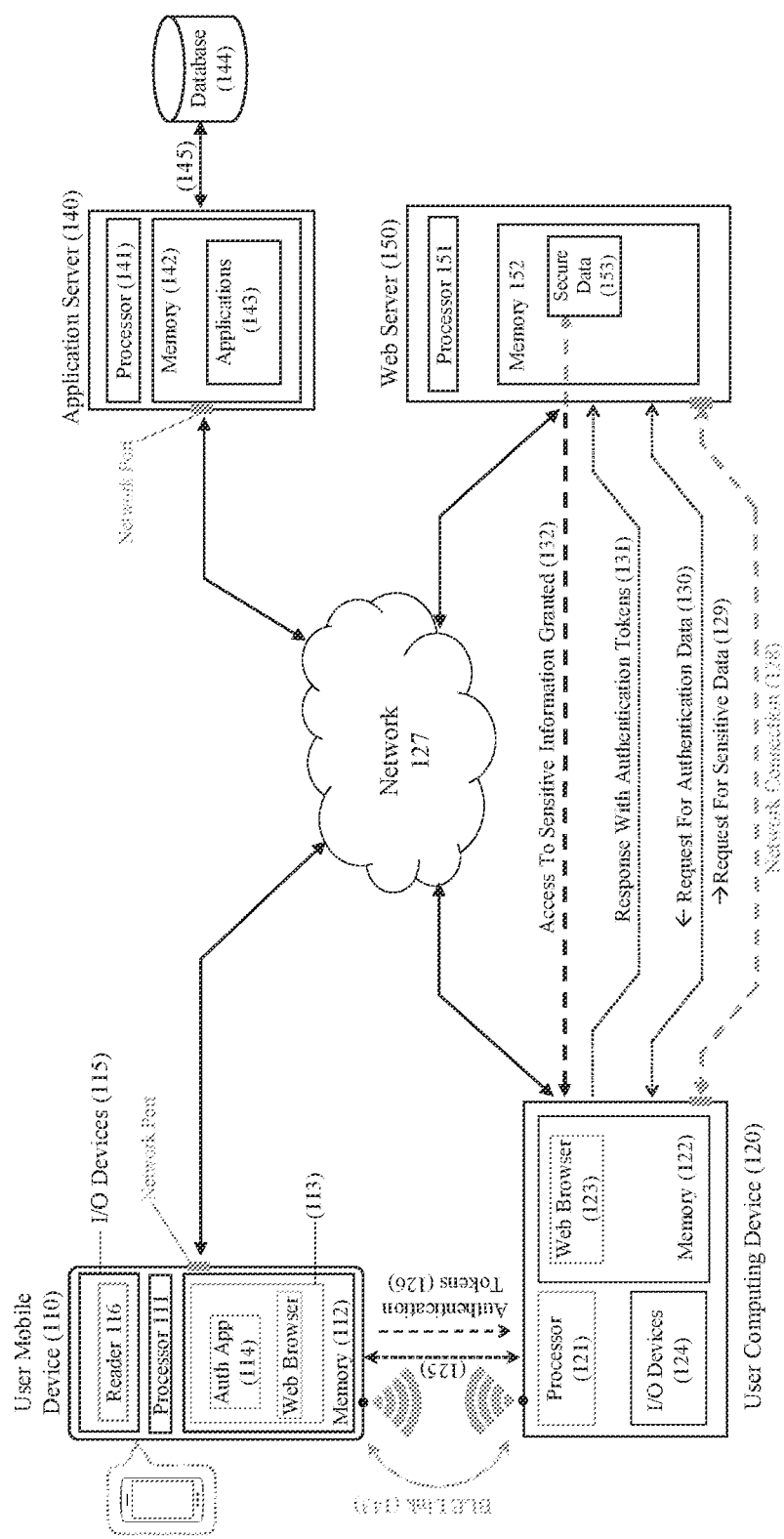
FIG. 1 illustrates an exemplary system implementation of context-switching authentication using a Bluetooth process, in accordance to some embodiments of the present disclosure.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is directed to a system and method for an improved implementation of access authentication that may be applied, for example, to grant access to sensitive resources and/or information over a public network, such as the Internet. The proposed scheme involves a novel integration of a browser functionality that enable websites to access and utilize hardware and software functionalities associated with a connecting computing device, (e.g., a smart phone and/or a tablet with a web browsing application) into a process to enable the connecting computing device, with no authentication capability, to establish authenticated access to restricted online resources.

As such, some embodiments of the present disclosure enable user and/or access authentication functionalities configured on one user device to be seamlessly applied to authenticate a connection initiated by another user device that may not have the aforementioned authentication configurations/functionalities. Therefore, in accordance to some embodiments, an authentication capability configured on a particular user device (e.g., smart phone, tablet) maybe dynamically applied to authenticate a connection initiated by another distinct user device (e.g., computer, laptop, tablet, smart phone, etc.). In this embodiment, authentication information between the two user devices may be communicated over a short range communication link such as Bluetooth Low Energy (BLE) link.

For the purpose of the present disclosure, the term "website" is used interchangeably to refer to a web server administering the website.

Another aspect of the present disclosure is directed to a system and method for implementing a two-form factor strong authentication process while requiring a single authentication input from a user. The two-form factor strong authentication process corresponds to a verification of user authentication information stored on a contactless card and read via NFC by a reader integrated and/or installed on a user mobile device. The contactless card, used in the authentication process comprises an integrated processor and memory for storing user identification credentials as NFC Data Exchange Format (NDEF) data. In this implementation of two-form factor strong authentication, a first form of authentication is implicitly verified upon successful pairing and interactions (of the access-requesting user device) with a another nearby user device (e.g., a user mobile device) which is also configured as a NFC reader for the contactless card. Verification of information obtained via an NFC read of the contactless card by the (nearby user device) user mobile device would constitute an explicit verification of the second form of authentication. Moreover, the only external authentication action (e.g., as provided by a user) required to facilitate the described two-form factor strong authentication scheme, is bringing the contactless card within NFC range of the mobile device reader.

In some embodiments, where a username and/or password may be used as a first form of authentication, a three form factor strong authentication may be accomplished by the described system and method based on verification of proximity to two distinct user associated devices (e.g., first user device in Bluetooth range of the second (access-requesting) user device and the contactless card within NFC range of the first user device) while requiring two authentication inputs from the user, which correspond to inputting username and/or password credentials through the mobile device and tapping the contactless card on the user mobile device.

One aspect of the present disclosure involves a dynamically triggered process initiated upon detection that a website code, received by a connecting user device (e.g., the website loaded by a browser of the connecting user device) comprises one or more instructions for initiating a Bluetooth process on the source device (e.g., the connecting user device), to thereby establish a Bluetooth Low Energy (BLE) connection with one or more other user devices within Bluetooth pairing range of the connecting user device. Once the aforementioned website code is detected, an authentication application, stored on a first user device disposed in Bluetooth pairing range of the connecting user device, may be automatically initiated, in accordance to the one or more instructions transmitted across the BLE connection.

The authentication application, launched on the first user device may then facilitate the generation and provision of required authentication information, in response to an authentication request from the website, to confirm that the entity requesting access to some access-restricted electronic resource and/or website, is in possession or in proximity of both the first user device (e.g., user mobile device with authentication capability) and the second device (e.g., the connecting user device) associated with an access-requesting entity, thus authenticating the entity as the user it claims to be and providing the requested access.

One aspect of the present disclosure is directed to a proposed system and method for using an authentication scheme involving a contactless card storing NFC transmittable user authentication information (readable, for example, by a mobile device with a reader component running a corresponding application) in conjunction with a browser functionality to utilize a Bluetooth process of a connecting user device, in order to enable the contactless card authentication process to authenticated a connection initiated by the connecting user device.

According to some embodiments, a user may dynamically receive one or more notifications on the first and/or the second user device, prompting the user to authenticate a web connection initiated from the second user device, using the first user device. The authentication information may be transmitted from the first device to the second device for communication to an authentication-requiring destination website. In other embodiments, the first device may send the authentication information directly to the authentication-requiring destination website, in order to authenticate the connection initiated from the second user device.

Some embodiments of the present disclosure are directed to providing a two-factor authentication strength based on verifying that the entity requesting access to sensitive user information is in possession of two devices, namely the first user device (e.g., smart phone, tablet with an NFC reader) and the contactless card with an NFC tag, while requiring only a single authentication action and/or input from the user (e.g., tapping of the NFC-enabled contactless card to a reader on the first user device actively paired with the (second) connecting user device.) As described above, the proposed context-switching authentication scheme may be enabled, for example, via any proximity-based electronic pairing protocol that may be established between the two the user devices.

One aspect of the present disclosure regards a method for implementing context-switching authentication, the method comprises a step of launching a particular authentication application, stored on a first user device, in response to a transmission received across a Bluetooth link established between the first and a second user device. The transmission may comprise a URI which identifies the particular authentication application stored on the first user device. The authentication application, upon being launched, may provide a listing of authentication schemes available on the first user device, wherein each authentication scheme is associated with one or more authentication actions performed by the user using the first user device. Upon a successful completion of the authentication process (based on a user selection of authentication scheme), the authentication application may generate one or more authentication tokens to represent a successful authentication outcome of the user-selected authentication scheme. The authentication tokens may be transmitted across a Bluetooth link, from the first user device to the second user device to thereby, upon transmission to the corresponding web server, authenticate a web access request initiated from a browser running on the second user device.

The information exchanged between the first and the second user device across the Bluetooth interlink may be encrypted and comprise one or more user Personal Identification Information (PII) and/or Payment Credentials Information (PCI).

In accordance to some embodiments, the one or more authentication actions performed using the first user device may comprise inputting one or more user login credentials into the first user device, and/or confirming user identity by inputting a temporary one time password sent as text and/or voice, to the first user device.

The URI encoded in the transmission received by the first device across the Bluetooth link may comprise a Hypertext Transfer Protocol (HTTP) deep link, which will redirect the user to an information page if the authentication application is not installed on the first user device. In some embodiments, the URI may be coded to redirect the user to an application store for downloading the authentication application if the authentication application is not installed on the first user device. In some embodiments the URI may comprise a universal link using a custom format with one or more identifiers for specifying a target application to be launched on the first user device. In some embodiments the URI may comprise a uniform resource locator (URL).

According to some embodiments, the one or more authentication tokens, generated by the authentication application running on the first user device, may be transmitted to an authentication-requesting web server via back end Application Programming Interface (API) integration with the authentication-requesting web server, to thereby authenticate a web access request initiated, by a browser running on the second user device.

One aspect of the present disclosure may regard a system for implementing context-switching authentication. The system may comprise a computer hardware arrangement that is configured to implement the authentication process, in accordance to the embodiments described above. Another aspect of the present disclosure may regard a non-transitory computer-readable medium comprising instructions for execution by a computer hardware arrangement, wherein, upon execution of the instructions the computer hardware arrangement is configured to perform procedures with respect to one or more embodiments described above.

FIG. 1 illustrates an exemplary system 100 for a context-switching authentication implementation which utilizes a first user device (e.g., user mobile device 110) to authenticate a sensitive-data access request (129) initiated by a second user device (120) across a standard network connection (128) to a network device hosting the sensitive data (e.g., web server 150, storing secure data 153) The request for sensitive data (129) may be initiated by a second user device (e.g., user computing device 120 also referred to as the access-requesting or the connecting user device, for the purposes of the present disclosure) and transmitted across network connection 128 to a destination web server (e.g., web server 150)

With reference to the exemplary embodiment 100 illustrated in FIG. 1, a BLE link (134), between the first and the second user device, may be invoked by a request for authentication data (130) sent to the access-requesting user device (120), by the destination web server (e.g., web server 150) in an attempt to authenticate the access request (129) to sensitive and/or secure data 153, stored thereon.

In addition to the first and second user devices, the exemplary system 100 may further comprise an application server (e.g., application server 140) communicatively coupled with user mobile device 110 and responsive to one or more communications from one or more applications (e.g., applications 113) stored on user mobile device 110. The Application server (140) may also be connected to a database (e.g., database 144) which may be used for storing one or more user Personal Identification Information (PII)

and/or Payment Credential Information (PCI). Although FIG. 1 illustrates single instances of the components, the system 100 may include any number of components.

Referring back to FIG. 1, the first user device (e.g., user mobile device 110) may receive one or more transmissions 125, across the BLE link (134) to the second user device (e.g., user computing device 120) disposed within Bluetooth pairing proximity of the first user device (110).

The one or more transmissions (125) may comprise the request for authentication data (130) received from the web server (150) and/or one or more electronic notifications and/or messages for specific authentication data required, by the (destination) web server (150), prior to granting the (access-requesting) second user device (120) access to the requested sensitive data (e.g., secure data 153) over the network connection (128). The transmissions (125) may further comprise an authentication response, in terms one or more authentication tokens (126), generated by an authentication application (114) running on the first user device (110) and/or corresponding applications (143) running on the application server (140). In some embodiments the generation of the authentication tokens (126) may be carried out in part by an application (from application suite 143) running on the application server (140) and in part by the authentication application (114) running on the first user device (110).

The request for authentication data (130), interchangeably referred to as authentication request (130) for the purposes of the present disclosure, may be generated by a (destination) web server (150) in response to the sensitive-data access request (129), and transmitted, over the network connection (128) to the access-requesting device (e.g., user computing device 120). Once received by the access-requesting user device (120), the authentication request (130) may be transmitted wirelessly from the access-requesting user device (120), over the dynamically invoked BLE link (134), to the first user device (110) for authentication processing. Upon completion of the authentication process, one or more authentication tokens (126) may be generated (indicating a successful authentication outcome) and sent over the BLE link to the access-requesting user device (120). The authentication tokens (126) may then be included in an authentication response (131) and communicated to the appropriate web server (e.g., web server 150) across the network connection (128), established, for example, over the network (127).

As described, in accordance to some embodiments of the present closure, the authentication process may be facilitated by an authentication application (114) stored on the user mobile device. The authentication application (114) may have one or more application components stored on the first user device and/or one or more components stored on the corresponding application server (140). In some embodiments, a user authentication process responsive to one or more authentication requests received by the user mobile device (110) across a Bluetooth Low Energy (BLE) link (e.g., BLE link 134) may be facilitated by the authentication application (114) performing one or more client-side operations and further communicating, across network 127, with one or more of applications 143 on the application server (140) to initiate the one or more server-side operations associated with the user authentication process. According to the exemplary embodiment 100, the user authentication process may correspond to the generation of authentication token (126) that may be transmitted to the second user device (120) directly across the BLE link (134). Authentication tokens 126, may then be transmitted. across network connection 128 to web server 150 to enable the access-requesting (second) user device (120) to access secure data 153 hosted on web server 150.

In some embodiments, authentication tokens 126 may be transmitted from the user mobile device (110), across BLE link 134, to the access-requesting device (e.g., user computing device 120) and transmitted therefrom to web server 150 across a network connection (128), established over network 127. The authentication tokens may also be transmitted directly by the (first) user mobile device (110) and/or the application server (120), to the appropriate web server (e.g., web server 150), via, for example, network 127. The web server (150) may store information about different authentication signatures from one or more validated sources to, for example, facilitate the verification and validation of the authentication tokens 126 included in the authentication response (131).

The user mobile device (110) may be configured to transmit one or more user-related data messages to the application server (140). The user-related data may correspond to one or more user-identifying information stored, in parts or in whole, on the user mobile device (110) and/or the application server (140). The user-related data may also correspond to one or more real-time captured user inputs provided in response to one or more actionable notifications received by the user mobile device (110).

The user mobile device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first user device (e.g., user mobile device 110) may include a processor (111), a memory (112), and one or more applications (113). Processor 111 may be a processor, a microprocessor, or other processor, and the first user device 110 may include one or more of these processors. Processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

Processor 111 may be coupled to memory 112. The memory (112) may be a read-only memory, write-once read-multiple memory or read/write memory, e.g., RAM, ROM, and EEPROM, and user mobile device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. Memory 112 may be configured to store one or more software applications (113), Memory 112 may also store user-related information such as the user's private and/or financial account information.

The one or more software applications 113 may comprise one or more mobile applications, a web browser with one or more browser extensions, one or more electronic data collection and authentication applications and/or one or more banking applications with, for example, integrated authentication functionality. Application 113 may further comprise instructions for execution on the first user device (e.g., user mobile device 110.) In some examples, the first user device 110 may execute one or more applications, such as software applications, that enable, for example, network communications with one or more components of the system 100, transmit and/or receive data, and perform the functions described herein. Upon execution by the processor 111, one or more applications from applications 113 may provide the functions described in this specification, specifically to execute and perform the steps and functions in the process flows described herein. For example, Authentication application 114 may conduct one or more client-side operations in performing one or more user authentication operations responsive to one or more authentication requests received across the BLE link (134) to the second user device (120). The execution of an authentication process and subsequent generation of authentication tokens 126, may be carried out in part or in full by authentication application 114 and/or corresponding server-side applications 143 stored on the application server (140). Authentication tokens 126, indicating a successful authentication outcome, may then be transmitted, by the first user device (110) to the user computing device (120) across the same BLE link (134), across which the one or more transmissions (125) comprising the authentication request (130) was received by the first user device (110). The Authentication tokens 126, may then be transmitted, by the second user device (120), across network connection 128, to the web server 150, as indicated by the data transfer (131). Upon confirming the authentication tokens (126), the web server (140) may validate the sensitive-data access request (129) and grant, the access-requesting (second) user device (120), access to the secure data (153), as indicated by the data transfer path (132) shown with respect to the exemplary embodiment 100 in FIG. 1.

Such processes may be implemented in software, such as software modules, for execution by computers or other machines. The one or more applications may further provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The first user device (e.g. user mobile device 110) may further include Input/Output (I/O) devices 115. I/O devices may comprise a display or any type of device for presenting visual information such as a computer monitor, a flat panel display, and a mobile device screen, including liquid crystal displays, light-emitting diode displays, plasma panels, and cathode ray tube displays. I/O devices 115 may also include any device for entering information that is available and supported by the user device (110), such as a touch-screen, keyboard, mouse, cursor-control device, touch-screen, microphone, digital camera, video recorder or camcorder. I/O devices 115 may also comprise a reader (116) to enable automatic acquisition/reading of data, using, for example, a Near-Field Communication (NFC) protocol. The I/O devices (115) may be used to enter and/or read-in information and interact with the software and other devices described herein.

Application server 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other computer and/or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Application server 140 may include a processor (141), a memory (142), and one or more applications (143). Processor 141 may be a processor, a microprocessor, or other processor, and application server 140 may include one or more of these processors. The processor (141) may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

Processor 141 may be coupled to memory 142. Memory 142 may be a read-only memory, write-once read-multiple memory or read/write memory, e.g., RAM, ROM, and EEPROM, and the application server (140) may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. Memory 142 may be configured to store one or more software applications, such as application suite 143. Application server 140 may also store data corresponding to PII and PCI of one or more users.

Application suite 143 may comprise one or more software applications comprising instructions for execution on the Application server (140). In some examples, application server 140 may execute one or more applications, such as software applications, that enable, for example, network communications with one or more components of system 100, transmit and/or receive data, and perform the functions described herein. Upon execution by the processor (141), one or more applications from application suite 143 may provide the functions described in this specification. For example, one or more applications from the application suite (143) may perform one or more server-side operations for implementing a user authentication process responsive to one or more authentication requests received by the user mobile device (110) across a Bluetooth Low Energy (BLE) link (e.g., BLE link 134) to a (second) access-requesting user device (120). The one or more authentication request may then be communicated to the application server (140) over the network (127). For example, one or more applications from application suite 143, stored on the application server (140), may provide one or more server-side functions for the generation of authentication tokens (126) that may be sent back to a corresponding application (e.g., authentication application 114) on the user mobile device (110) and transmitted therefrom to the connection-requesting user device (120) across the BLE link (134). Authentication tokens 126, may then be included in the authentication response (131) and transmitted across network connection 128 to web server 150 to facilitate the authentication of sensitive-data access request 129 and provide the access-requesting user device (120) with access to the secure data (153), as represented by the data access path (132) in the exemplary system implementation (100).

Such processes may be implemented in software, such as software modules, for execution by computers or other machines. Applications 113 and/or 143 may provide GUIs through which a user may view and interact with other components and devices within system 100. The GUIs may be formatted, for example, as web pages in Hypertext Markup Language (HTML), Extensible Markup Language (XML) or in any other suitable form for presentation on a display device depending upon applications used by users to interact with system 100.

Database 144 may comprise one or more databases configured to store data, including without limitation, one or more user identifying and/or financial accounts information. Database 144 may comprise a relational database, a non-relational database, or other database implementations, and any combination thereof, including a plurality of relational databases and non-relational databases. In some examples, database 144 may comprise a desktop database, a mobile database, or an in-memory database. Further, database 144 may be hosted internally by the application server (140) or implemented externally on a distinct storage device or database, or on any storage device that is in data communication with the application server (140). Database 144 may be supported by one or more local servers, or associated with a cloud-based platform.

System 100 may also include one or more networks 127. In some examples, network 127 may be one or more of a wireless network, a wired network or any combination of wireless network and wired network, and may be configured to connect the user mobile device (110), the user computing device (120), the application server (140) and the web server (150). Database 144 may be connected to application Server 140 via network 127 and/or a direct connection (145). Network 127 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 127 may include, without limitation, telephone lines, fiber optics, IEEE Ethernet 902.3, a wide area network, a wireless personal area network, a LAN, or a global network such as the Internet. In addition, the network 127 may support an Internet network, a wireless communication network, a cellular network, or the like, or any combination thereof. Network 127 may further include one network, or any number of the exemplary types of networks mentioned above, operating as a stand-alone network or in cooperation with each other. Network 127 may utilize one or more protocols of one or more network elements to which they are communicatively coupled. The network 127 may translate to or from other protocols to one or more protocols of network devices. Although the network 127 is depicted as a single network, it should be appreciated that according to one or more examples, the network 127 may comprise a plurality of interconnected networks, such as, for example, the Internet, a service provider's network, a cable television network, corporate networks, such as credit card association networks, and home networks. The network 127 may further comprise, or be configured to create, one or more front channels, which may be publicly accessible and through which communications may be observable, and one or more secured back channels, which may not be publicly accessible and through which communications may not be observable.

In some examples, communications between the user mobile device (110) and the applications server (140) may occur using one or more front channels and one or more secure back channels. A front channel may be a communication protocol that employs a publicly accessible and/or unsecured communication channel. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. In some embodiments, communication link between the user mobile device (110) and the application server (140) may correspond to a secure back channel communication. In some examples, the selective number of devices may comprise known, trusted, or otherwise previously authorized devices. Exemplary secure back channels include, without limitation, a closed network, a private network, a virtual private network, an offline private network, and other private communication networks.

Referring back to FIG. 1, the request for authentication data (130), sent back to the second (access-requesting) user device (120) may comprise one or more instructions for obtaining the required user authentication data from another source within pairing proximity of the access-requesting user device (120). Accordingly, BLE link 134 may be established in response, to facilitate the exchange of authentication request and/or response messages (125) between the second (connection-requesting) and the first (authentication providing) user devices. In one embodiments, the one or more instructions sent back, from the web server (150), with the request for authentication data (130), may comprise a Uniform Resource Indicator (URI) that identifies an authentication mode and/or authentication application (e.g., authentication application 114) stored on the user mobile device (110), which may be used for facilitating the authentication process.

In accordance to some embodiments, invocation of one or more applications (e.g., authentication application 114) stored on the user mobile device (110) may require user authorization and may only be allowed to proceed upon detection of a specific user input provided, for example, in response to an authentications request (130) included in the transmission (125) and received, by the user mobile device (110), across the BLE link (134) to the (second) user computing device (120). In accordance to some embodiments, user authentication-related inputs (e.g., captured through one or more of I/O devices 115, installed on user mobile device 110) may be transmitted to the application server (140) for execution.

As described above, one aspect of the proposed system and method is directed to an authentication scheme involving a uniquely configured contactless card with an integrated NFC tag storing NFC transmittable user authentication information (readable, for example, by a mobile device with a reader component and running a corresponding application). The specific structure, configuration and operations of the contactless card, including its integrated processor, memory and NFC functionality and secure method of sensitive information storage as NFC transmittable data, are described with reference to FIGS. 3A and 3B. An exemplary system implementation (200) for context-switching authentication using the aforementioned contactless card is shown in FIG. 2.

Figure 2:
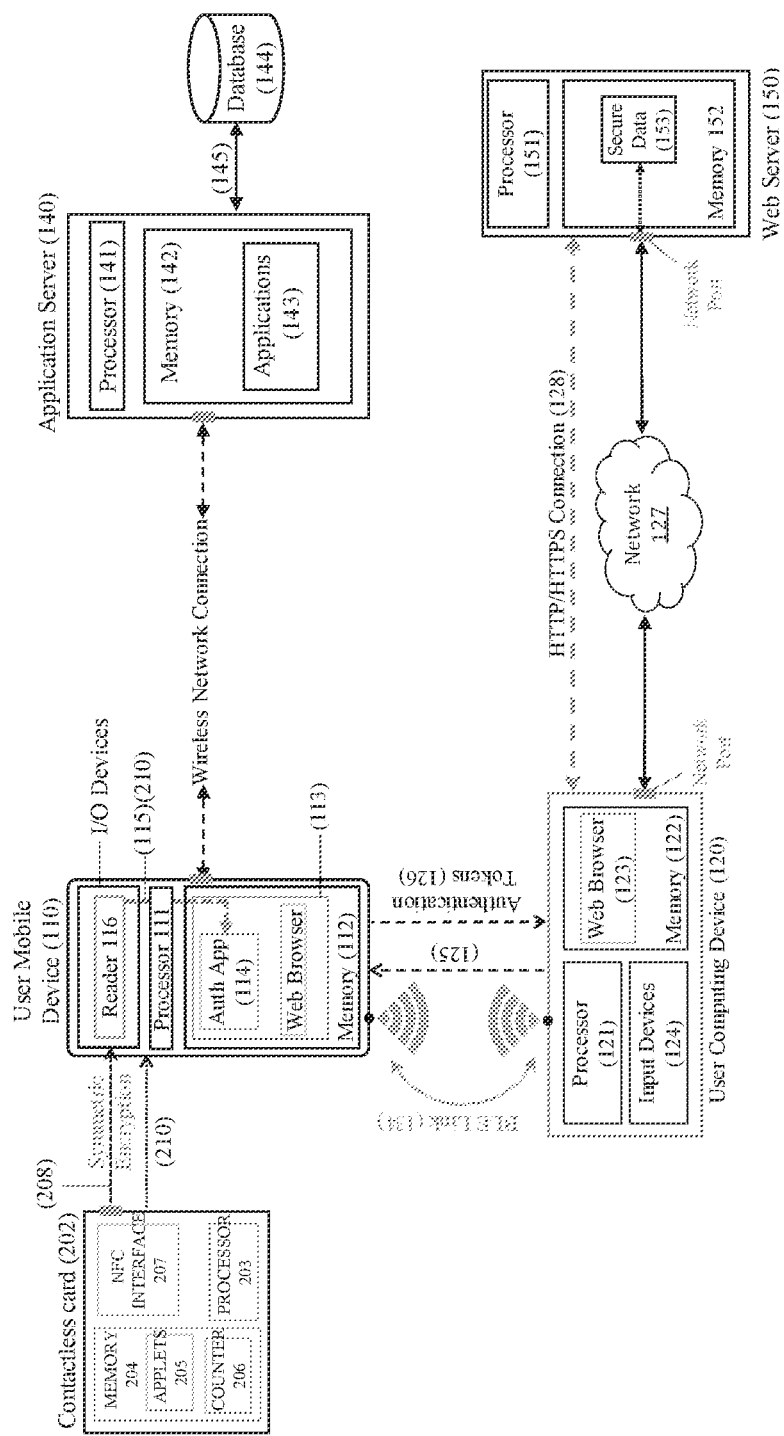
FIG. 2 illustrates an exemplary system implementation of context-switching authentication for providing a two-factor strong authentication based on a single user action, in accordance to some embodiments of the present disclosure.

FIG. 2 illustrates an exemplary system and method for the implementation of context-switching authentication, utilizing a contactless card (202) readable, for example, by the first user device (e.g., user mobile device 110). The contactless card (202) may comprise an integrated processor (203) and memory (204). The card-integrated memory (204) may store a plurality of items comprising one or more applets (205) which may be communicatively coupled to one or more applications running on the user mobile device 110 and/or one or more applications stored on a corresponding application server. The card-integrated memory (204) may also store an application transaction counter (206) to track a sequence of transactions involving the contactless card (202). The contactless card (202) may further comprise a Near Field Communication (NFC) interface (207) to facilitate NFC communication with, for example, the user mobile device (110).

In accordance to some embodiments, the contactless card (202) and the user mobile device (110) may be used in conjunction with a browser functionality to access a Bluetooth process of an access-requesting user device (e.g., second user device 120), in order to enable a single authentication action, involving the contactless card (202) and the first user device (110) to provide a two-factor strong authentication for a connection request initiated by the (access-requesting) second user device (120), disposed within Bluetooth pairing distance of the first user device (110).

The exemplary context-switching authentication implementation (200), illustrated in FIG. 2, utilizes a contactless card (202) having a symmetrically encrypted NFC channel (208) to the first user device (110) for the encrypted transmission of user authentication data 210 (stored on the contactless card (202) as NDEF data), to, for example, the authentication application (114) running on the first user device (110). The NFC channel (208), may be activated, for example, when a reader (116) of the user mobile device (110) move into NFC proximity of the contactless card (202), and/or vice versa.

In the exemplary embodiment (200), the configuration involving the contactless card (202) and user mobile device (110) is utilized in conjunction with the Bluetooth communication link (e.g., BLE link 134) dynamically established between the (second) access-requesting device (e.g., user computing device 120) and the first user device (110), to implement a two-factor authentication strength. The two factor authentication strength may correspond, for example, to confirming that the entity or source requesting access to the sensitive user information (e.g., secure data 153) from the second user device (120) is in possession of two other distinct user devices, namely the first user device (e.g., user mobile device 110) and the contactless card (202)). The described context-switching authentication scheme provides a two-factor authentication strength while only requiring a single authentication action/input from the user (e.g., tapping of the NFC-enabled contactless card (202) to a reader (116) of the first user device (110), which is proximity paired with the (access-requesting) second user device (120). The proposed context-switching authentication scheme may be enabled, for example, via any proximity-based electronic pairing protocol that may be established between the first (110) and the second (120) user devices.

Figure 3A:
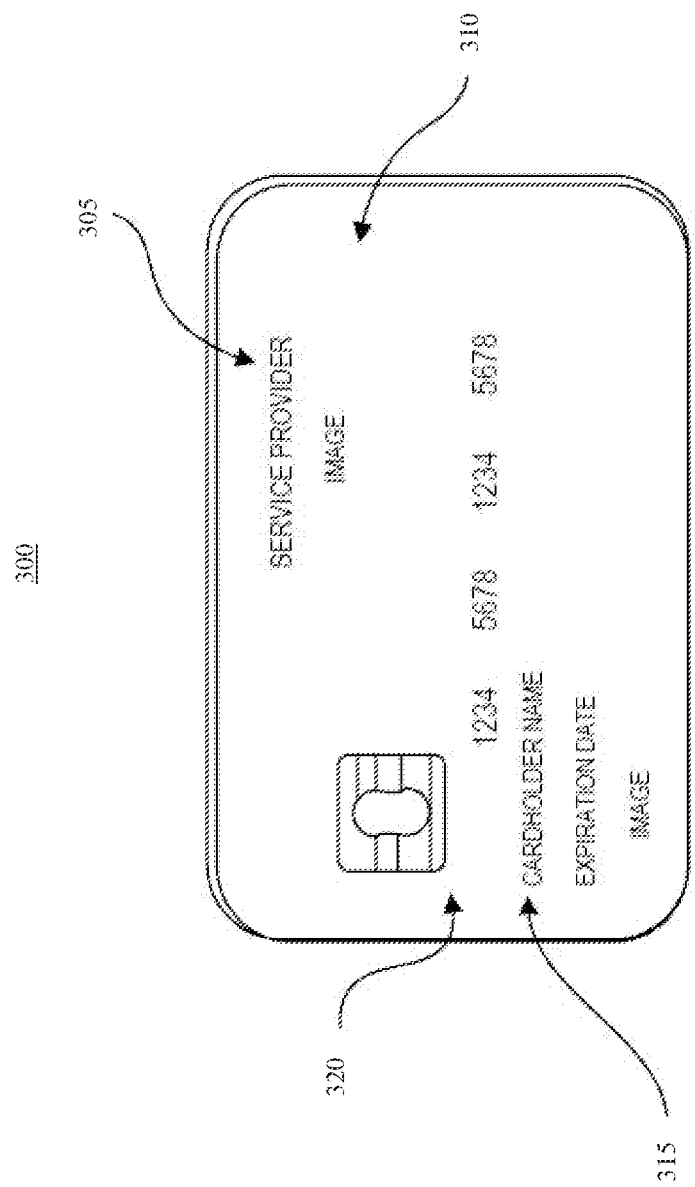
FIG. 3A is an illustration of a contactless card in accordance to some embodiments of the present disclosure.
Figure 3:
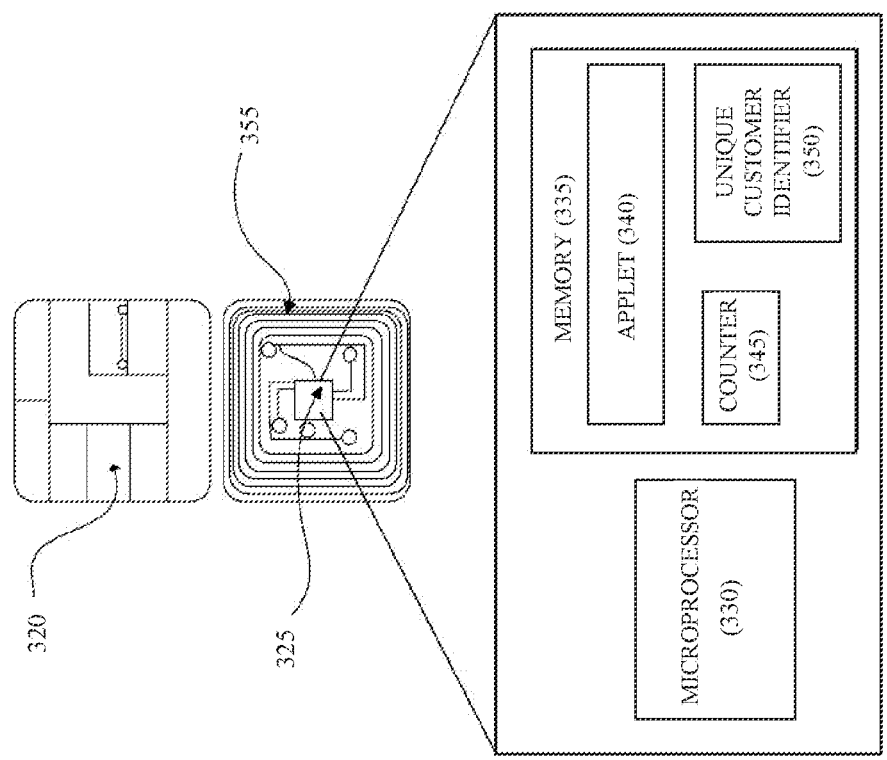
FIG. 3B is an illustration of a contact pad of a contactless card in accordance to some embodiments of the present disclosure.

FIGS. 3A-3B illustrate an exemplary contactless card 300. Although FIG. 3A-3B illustrate single instances of components of card 300, any number of components may be utilized.

Card 300 may be configured to communicate with one or more components of system 100. Card 300 may comprise a contact-based card (e.g., a card read by a swipe of a magnetic stripe or by insertion into a chip reader) or a contactless card, and the card 300 may comprise a payment card, such as a credit card, debit card, or gift card. As shown in FIG. 3A, the card 300 may be issued by a service provider designation 305 displayed on the front of the card 300 (and/or on the back of the card 300). In some examples, the payment card may comprise a dual interface contactless payment card. In some examples, the card 300 is not related to a payment card, and may comprise, without limitation, an identification card, a membership card, and a transportation card.

Card 300 may comprise a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the card 300 may have physical characteristics compliant with the ID-1 format of the ISO/IEC 7810 standard, and the card 300 may otherwise be compliant with the ISO/IEC 14443 standard. However, it is understood that the card 300 according to the present disclosure may have different characteristics, and the present disclosure does not require implementation in a payment card.

The card 300 may also include identification information 315 displayed on the front and/or back of the card, and the card 300 may also include a contact pad 320. The contact pad 320 may be configured to establish contact with another communication device, including but not limited to a user device, smartphone, laptop, desktop, or tablet computer. The card 300 may also include processing circuitry, antenna and other components not shown in FIG. 3A. These components may be located behind the contact pad 320 or elsewhere on the substrate 310.

The service provider designation 305 may include the name and logo of the service provider, and may also include information relating to the service provider, including without limitation a telephone number, address, instructions for handling the card 300 if has been lost or damaged, and other information. The service provider designation 305 may also include an image or graphical design.

The identification information 315 may include, without limitation, an account number, a name, an expiration date, a phone number, a nickname, and other information. In some examples, the identification information 315 may further include an image or graphical design. For example, the identification information 315 may include an image of the user, a picture, a drawing, or a logo.

As illustrated in FIG. 3B, the contact pad 320 of FIG. 3A may include processing circuitry 325 for storing and processing information, including a processor 330, such as a microprocessor, and a memory 335. It is understood that the processing circuitry 325 may contain additional components, including processors, memories, error and parity/CRC checkers, data encoders, anticollision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, and a customer identifier 350. The one or more applets 340 may comprise one or more software applications configured to execute on one or more contact-based or contactless cards, such as Java Card applet. However, it is understood that applets 340 are not limited to Java Card applets, and instead may be any software application operable on contact-based or contactless cards or other devices having limited memory. The one or more counters 345 may comprise a numeric counter sufficient to store an integer. The customer identifier 350 may comprise a unique alphanumeric identifier assigned to a user of the card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the contact pad 320 or entirely separate from it, or as further elements in addition to processor 330 and memory 335 elements located within the contact pad 320.

In some examples, the card 300 may comprise one or more antennas 355. The one or more antennas 355 may be placed within the card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of card 300 may act as the secondary of an air core transformer. The terminal may communicate with the card 300 by cutting power or amplitude modulation. The card 300 may infer the data transmitted from the terminal using the gaps in the card's power connection, which may be functionally maintained through one or more capacitors. The card 300 may communicate back by switching a load on the card's coil or load modulation. Load modulation may be detected in the terminal's coil through interference.

Figure 4:
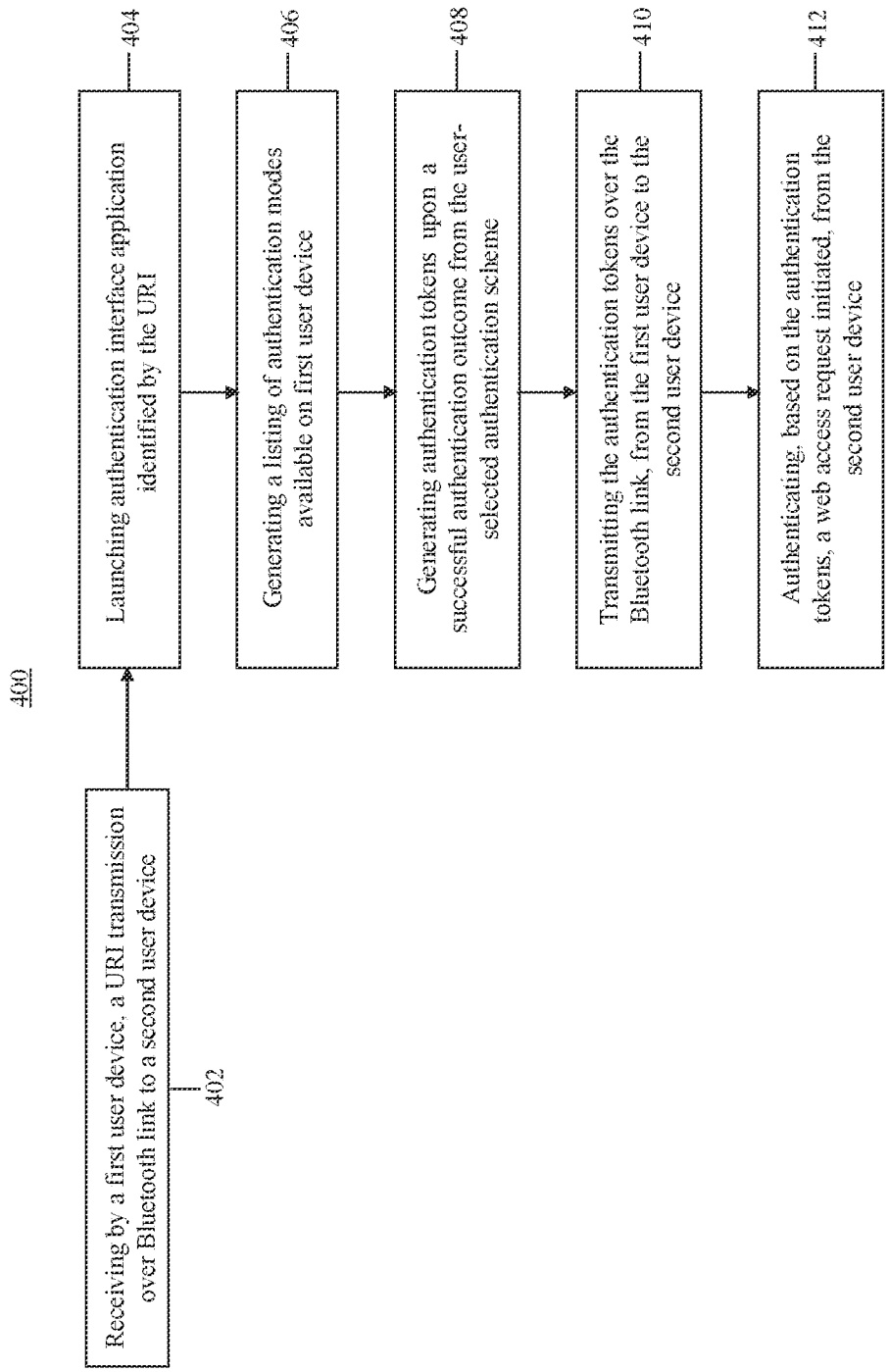
FIG. 4 is a flow diagram of an automated context-switching authentication process, in accordance to some embodiments of the present disclosure.

FIG. 4 provides an operational overview of a context-switching authentication process in accordance to some embodiments of the present disclosure. Referring to FIG. 4, at (402) a first user device (e.g., user mobile device 110) receives a URI containing transmission over a Bluetooth link established with a second user device (e.g., user computing device 120) within appropriate range of the first user device. Upon reception of the transmission over the BLE link with the second user device, an authentication interface application identified by the URI is launched on the first user device (step 404). The authentication interface application may provide a listing of authentication modes and programs available on the first user device (step 406). Once an authentication mode is selected and appropriate authentication inputs commensurate with the selected authentication mode are entered using, for example, the first user device, the authentication information is verified. One or more authentication tokens are generated in step 408 to represent a successful authentication of a user. The authentication process, and subsequent generation of authentication tokens, may involve matching user authentication inputs against previously validated and securely stored user information. This process may be carried out by an authentication application on the user mobile device (110) and/or the corresponding server-side application on the application server (140). In some embodiments the authentication operation may be carried out in part by the authentication application on the first user device (110) and in part by the corresponding application server (140).

At step 410, the authentication tokens are transmitted over the Bluetooth link, from the first user device (110) to the second device (120). In some embodiments, the authentication tokens may be generated and transmitted, by the application server (120), directly over a public network connection (e.g., network 127) to the access-requesting device (e.g., second user device 120). At step 412 the authentication tokens are communicated to the webserver hosting the sensitive data content (e.g., secure data 153) to thereby authenticate a web access request initiated from the second user device (120). It is noted that the web access request may be initiated by the user or automatically (e.g., by a website or application on the second user device).

Figure 5:
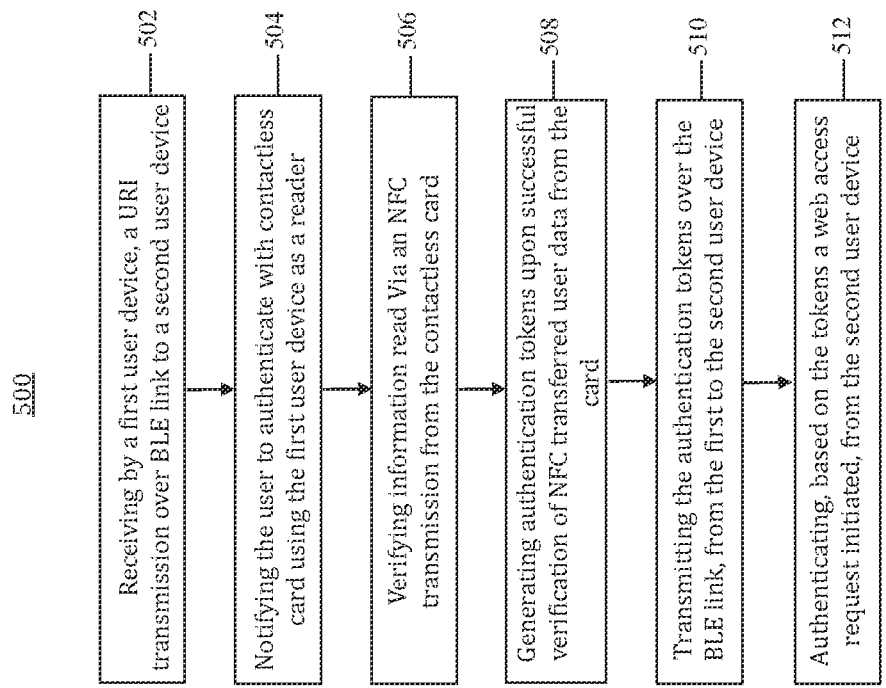
FIG. 5 is a flow diagram of an automated context-switching authentication process implementing two-factor authentication with a single authentication action from a user, in accordance to some embodiments of the present disclosure.

FIG. 5 illustrates an exemplary flowchart (500) corresponding to an operational overview of a context-switching authentication process in accordance to some embodiments of the present disclosure. Referring to the exemplary flow diagram (500), at step 502 a first user device (e.g., user mobile device 110) receives a URI transmission over a Bluetooth link established with a second user device (e.g., user computing device 1120) disposed within appropriate range of the first user device. Upon reception of the transmission over the BLE link with the second user device, a notification is generated for the user to authenticate with a contactless card (e.g., contactless card 202) using the first user device (e.g., user mobile device 110) as a reader. At step 506 the information read via the NFC transmission from the contactless card is verified. The verification may be performed by an appropriate application on the user mobile device and/or the corresponding application on the application server (140) communicatively coupled to the user mobile device. Upon confirming the information, one or more authentication tokens are generated to signify a successful verification of the NFC transferred data from the contactless card (202). The authentication tokens may be generated by one or more applications stored on the user mobile device 110 and/or the application server 140. At step 510, the authentication tokens are transmitted over an active BLE link, form the first to the second user device. At step 512, the authentication tokens are communicated to the authentication-requesting web server to thereby authenticate a secure network connection request initiated from the second user device. It is noted that the secure network connection request may be initiated by the user or automatically (e.g., by a website or application on the second user device).

Figure 6:
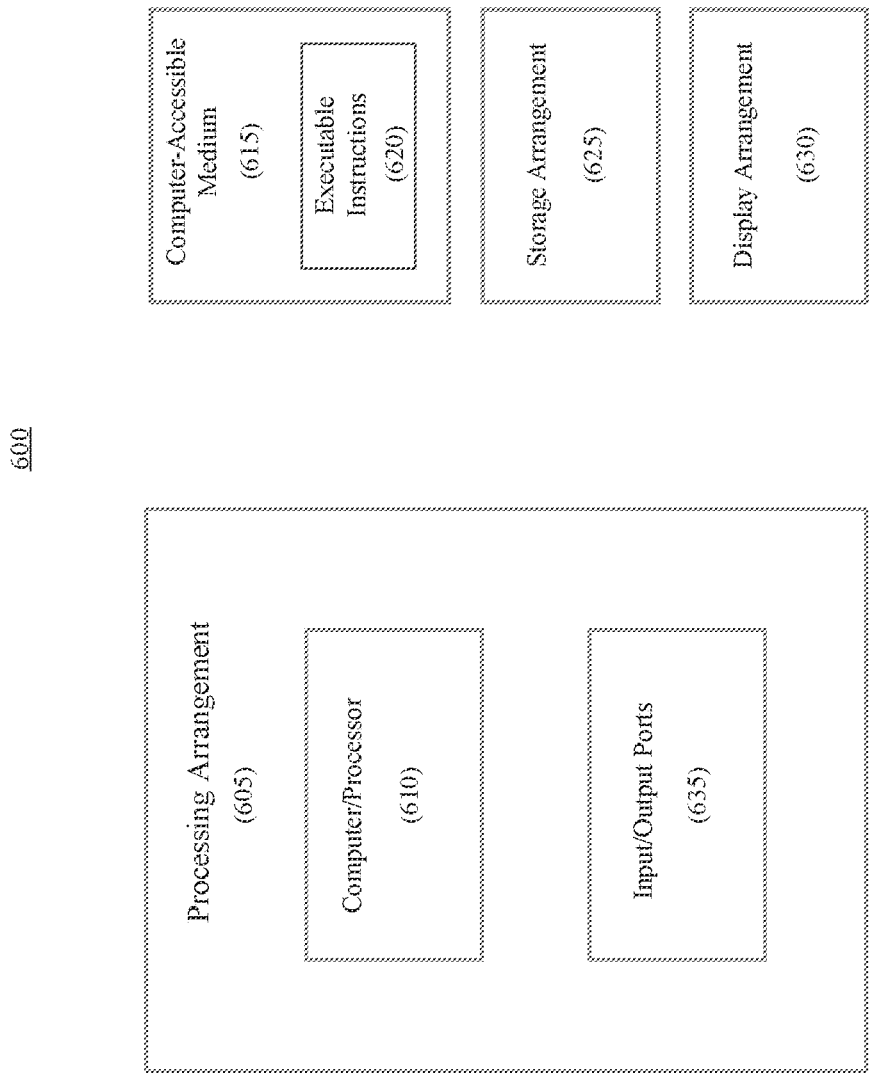
FIG. 6 is a block diagram illustration of an exemplary system, in accordance to some embodiments of the present disclosure.

FIG. 6 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 605. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 6, for example a computer-accessible medium 615 (e.g., as described herein above, a storage device such as a hard disk, floppy disk, memory stick, CD-ROM, RAM, ROM, etc., or a collection thereof) can be provided (e.g., in communication with the processing arrangement 605). The computer-accessible medium 615 can contain executable instructions 620 thereon. In addition or alternatively, a storage arrangement 625 can be provided separately from the computer-accessible medium 615, which can provide the instructions to the processing arrangement 605 so as to configure the processing arrangement to execute certain exemplary procedures, processes, and methods, as described herein above, for example.

Further, the exemplary processing arrangement (605) can be provided with or include input/output ports (635), which can include, for example a wired network, a wireless network, the internet, an intranet, a data collection probe, a sensor, etc. As shown in FIG. 6, the exemplary processing arrangement (605) can be in communication with an exemplary display arrangement (630), which, according to certain exemplary embodiments of the present disclosure, can be a touch-screen configured for inputting information to the processing arrangement in addition to outputting information from the processing arrangement, for example. Further, the exemplary display arrangement (630) and/or a storage arrangement (625) can be used to display and/or store data in a user-accessible format and/or user-readable format.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

Systems and methods described herein can provide secure, authenticated access to restricted electronic resources and/or websites. Once authenticated access has been established, the resources and/or websites can permit, without limitation, financial transactions (e.g., credit card and debit card transactions), account management transactions (e.g., card refresh, card replacement, and new card addition transactions), membership transactions (e.g., joining and departing transactions), point of access transactions (e.g., building access and secure storage access transactions), transportation transactions (e.g., ticketing and boarding transactions), and other transactions.

As used herein, personal identification information (PII) can include any sensitive data, including financial data (e.g., account information, account balances, account activity), personal information and/or personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for implementing context-switching authentication, the method comprising:
    receiving, by an authentication application stored on a first user device from a second user device, a transmission across a communication link established between the first user device and the second user device, the transmission comprising an authentication request including a Uniform Resource Indicator (URI) and instructions for obtaining user authentication data from the first user device, wherein:
    the URI comprises a universal link with one or more identifiers specifying the authentication application and a target application to be launched on the first user device,
    the authentication request is transmitted by a web server to the second user device, and
    the authentication request is generated by the web server in response to a web access request initiated from a browser running on the second user device for accessing sensitive data stored on the web server;
    generating, by the authentication application, a listing of authentication schemes available on the first user device, wherein each authentication scheme is associated with one or more authentication actions using the second user device;
    generating, by the authentication application, one or more authentication tokens to represent a successful authentication outcome of a user-selected authentication scheme; and
    transmitting the one or more authentication tokens across the communication link from the first user device to the second user device to thereby authenticate the web access request initiated from the browser running on the second user device.

2. The method of claim 1, wherein the one or more authentication actions comprise one or more of: inputting login credentials using the first user device, and confirming identity by inputting a temporary one time password sent as text and/or voice, to the first user device.

3. The method of claim 1, wherein the URI comprises a Hypertext Transfer Protocol (HTTP) deep link, which will redirect the first user device to an information page if the authentication application is not installed on the first user device.

4. The method of claim 1, wherein the URI is coded to redirect the first user device to an application store for downloading the authentication application if the authentication application is not installed on the first user device.

5. The method of claim 1, wherein the universal link uses a custom format.

6. The method of claim 1, wherein a website loaded by the browser on the second user device comprises instructions for initiating a communication process on the second user device to establish a connection with the first user device in pairing distance of the second user device.

7. The method of claim 1, wherein information exchanged between the first user device and the second user device across the communication link is encrypted.

8. The method of claim 1, wherein information exchanged between the first user device and the second user device across the communication link comprises one or more user personal identification information (PII).

9. The method of claim 1, wherein information exchanged between the first user device and the second user device across the communication link comprises payment related information.

10. The method of claim 1, wherein, an authentication scheme from the listing of authentication schemes available on the first user device, corresponds to a verification of one or more information obtained by performing an NFC read of a contactless card by the first user device, the contactless card storing one or more user identifying information as NFC transmittable data.

11. The method of claim 1, wherein the one or more authentication actions corresponds to a single user action of bringing a contactless card within NFC range of the first user device.

12. The method of claim 1, wherein the one or more authentication tokens are transmitted from the first user device to the web server via backend Application Programming Interface (API) integration with the web server.

13. A system for implementing context-switching authentication, the system comprising:
    a computer hardware arrangement comprising one or more processors and one or more memories, the computer hardware arrangement configured to:
        receive a transmission from a second user device across a communication link established between a first user device and the second user device, the transmission comprising an authentication request including a Uniform Resource Indicator (URI) and instructions for obtaining user authentication data from the first user device, wherein;
        the URI comprises a universal link with one or more identifiers specifying an authentication application and a target application to be launched on the first user device,
        the authentication request is transmitted by a web server to the second user device, and
        the authentication request is generated by the web server in response to a web access request initiated from a browser running on the second user device for accessing sensitive data stored on the web server;
    generate, a listing of authentication schemes available on the first user device, wherein each authentication scheme is associated with one or more authentication actions performed by a user using the second user device;
    generate one or more authentication tokens to represent a successful authentication outcome of a user-selected authentication scheme; and
    transmit the one or more authentication tokens across the communication link to the second user device to thereby authenticate the web access request initiated from the browser running on the second user device.

14. The system of claim 13, wherein the computer hardware arrangement is further configured to provide an authentication scheme comprising using the first user device as a reader for performing a Near Field Communication (NFC)

read of a contactless card storing user identifying information as NFC transmittable data, and generating the one or more authentication tokens.

15. The system of claim 14, wherein the computer hardware arrangement is configured to transmit the one or more authentication tokens, generated by the authentication scheme, to an authentication-requesting web server, via a back end Application Programming Interface (API) integration with the authentication-requesting web server.

16. The system of claim 13, wherein the computer hardware arrangement is further configured to encrypt information exchanged across the communication link between the second user device and the first user device.

17. The system of claim 13, wherein the computer hardware arrangement is further configured to transmit one or more user personal identification information (PII) as part of information exchanged across the communication link.

18. A non-transitory computer-readable medium comprising instructions for execution by a computer hardware arrangement, wherein, upon the execution of the instructions the computer hardware arrangement is configured to perform procedures comprising:
 receiving a transmission from a second user device across a communication link established between a first user device and the second user device, the transmission comprising an authentication request including a Uniform Resource Indicator (URI) and instructions for obtaining user authentication data from the first user device, wherein:
  the URI identifies an authentication application stored on the first user device,
  wherein the URI comprises a universal link with one or more identifiers specifying the authentication application and a target application to be launched on the first user device,
  the authentication request is transmitted by a web server to the second user device, and
  the authentication request is generated by the web server in response to a web access request initiated from a browser running on the second user device for accessing sensitive data stored on the web server;
 generating a listing of authentication schemes available on the first user device, the listing of authentication schemes being responsive to a selection input made using the first user device, wherein each authentication scheme is associated with one or more authentication actions performed by a user using the first user device;
 generating, one or more authentication tokens to represent a successful authentication outcome of a user-selected authentication scheme; and
 transmitting the one or more authentication tokens across the communication link to the second user device to thereby authenticate the web access request initiated from the browser running on the second user device.

19. The non-transitory computer-readable medium of claim 18, wherein an authentication scheme used for generating the one or more authentication tokens corresponds to performing an NFC read of a contactless card by the first user device, the contactless card storing user identifying information as NFC transmittable data.

20. The non-transitory computer-readable medium of claim 18, comprising further instructions for configuring the computer hardware arrangement to transmit the one or more authentication tokens, generated by a selected authentication scheme, to an authentication-requesting web server, via a back end Application Programming Interface (API) integration with the authentication-requesting web server.

* * * * *